United States Patent [19]

Telford

[11] Patent Number: 4,890,490

[45] Date of Patent: Jan. 2, 1990

[54] LIQUID LEVEL MONITORING

[75] Inventor: David W. Telford, Caithness, United Kingdom

[73] Assignee: United Kingdom Atomic Energy Authority, London, England

[21] Appl. No.: 205,829

[22] Filed: Jun. 13, 1988

[30] Foreign Application Priority Data

Jul. 6, 1987 [GB] United Kingdom ................ 8715841

[51] Int. Cl.⁴ .............................................. G01F 23/28
[52] U.S. Cl. .................................. 73/290 V; 340/621
[58] Field of Search ....................... 73/290 V; 340/621

[56] References Cited

U.S. PATENT DOCUMENTS

| | | | |
|---|---|---|---|
| 2,713,263 | 7/1955 | Turner | 73/290 V |
| 2,787,160 | 4/1957 | Valkenbury | |
| 2,990,482 | 6/1961 | Kenny | 73/290 V |
| 3,163,843 | 12/1964 | Dieckamp | 73/290 V |
| 3,394,589 | 7/1968 | Tomioka | 73/290 V |
| 3,512,400 | 5/1970 | Lynnworth | 73/599 |
| 4,118,983 | 10/1978 | Brazhnikov | 73/290 V |
| 4,316,183 | 2/1982 | Palmer et al. | 73/290 V |
| 4,320,659 | 3/1982 | Lynnworth et al. | 73/290 V |
| 4,403,508 | 9/1983 | Langlois | 73/589 |
| 4,679,430 | 7/1987 | Scott-Kestin et al. | 73/290 V |

FOREIGN PATENT DOCUMENTS

| | | | |
|---|---|---|---|
| 537253 | 12/1976 | U.S.S.R. | 73/290 V |
| 818351 | 8/1959 | United Kingdom | 73/290 V |
| 1071734 | 6/1967 | United Kingdom | |
| 1123939 | 8/1968 | United Kingdom | |
| 2019568 | 10/1979 | United Kingdom | |
| 2092408 | 8/1982 | United Kingdom | |
| 2137348 | 10/1984 | United Kingdom | |
| 2152667 | 8/1985 | United Kingdom | |

OTHER PUBLICATIONS

Gillespie et al, "A New Ultrasonic Technique for the Measurement of Liquid Level", *Ultrasonics*, Jan. 1982, pp. 13-17.

Primary Examiner—Allan N. Shoap
Assistant Examiner—Thomas B. Will
Attorney, Agent, or Firm—William R. Hinds

[57] ABSTRACT

Ultrasonic Lamb waves are launched into a thin-section metal plate (10) which extends generally vertically above the contents of a vessel. As long as the lower end (18) of the plate (10) is above the liquid level, the Lamb waves are reflected at the lower boundary to give a full amplitude return signal. If however the liquid level rises into contact with the plate, mode conversion occurs at the interface between the plate and the liquid resulting in a reduced amplitude return signal. The arrangement may be used as a limit switch or may be calibrated to enable the liquid level to be related to the strength of the return signal. In a more elaborate arrangement, the plate (10) is of stepped configuration so as to present a series of shoulders (20A, 20B) at different heights. Each shoulder gives rise to a respective return signal and analysis of the return signals allows the liquid level to be determined. The plate may be tens of meters in length and may be used as a level sensor in the primary vessel of a nuclear reactor. The transducer and associated electronics may therefore be located remotely from the liquid level (e.g. externally of the reactor vessel).

8 Claims, 2 Drawing Sheets

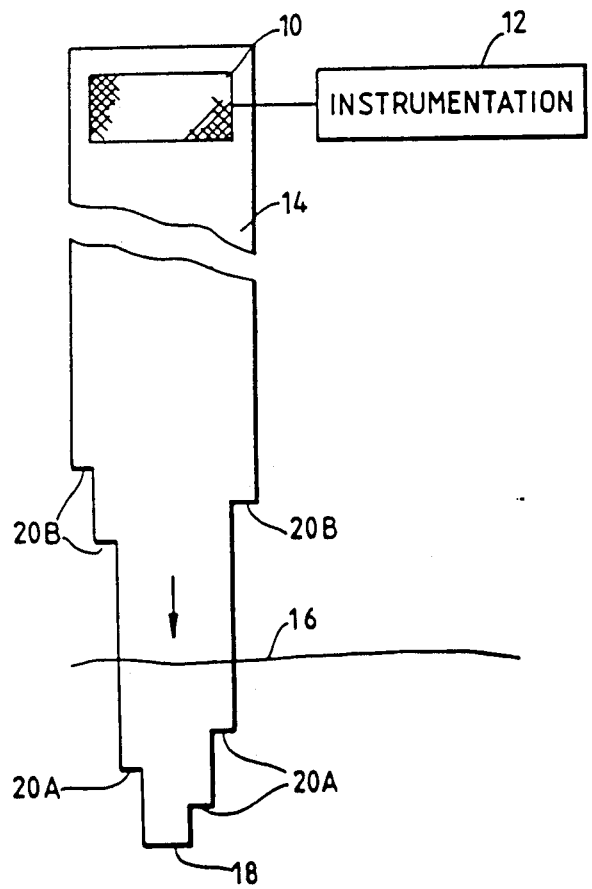
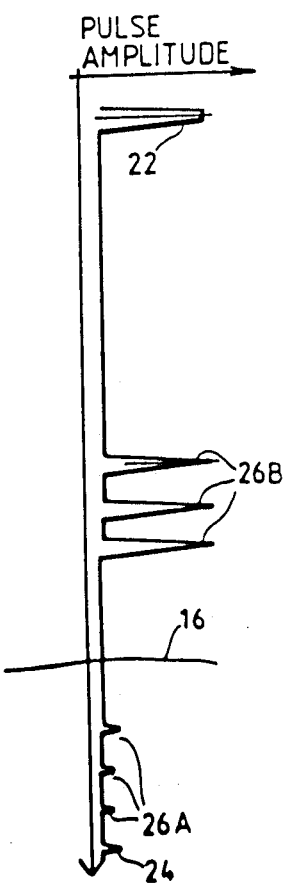
Fig.2.
Fig.3.

LIQUID LEVEL MONITORING

This invention relates to the monitoring of liquid levels by means of acoustic wave generating transducers, especially in hostile environments where it is desirable or essential for the transducer to be located remotely from the liquid.

U.S. Pat. No 2787160 discloses an ultrasonic liquid depth indicator in which a strip is mounted vertically within a liquid-containing tank and surface waves are excited in the strip by a transducer. Such surface waves are said to energise the strip surface to which the transducer is applied but they do not extend to the opposite wall of the strip. The strip is formed with vertically spaced holes which are preferably sealed to exclude the liquid. Those holes above the liquid surface provide srong reflected signals whereas those in that part of the strip which is immersed provide only weak reflected signals because the surface waves are damped by the liquid. The level indicator of U.S. Pat. No. 2787160 suffers from the disadvantage that, at the location of penetration into the vessel, the surface in which the surface waves are excited may only be acoustically coupled with the transducer otherwise surface waves are not transmitted along the strip. As a consequence, the point of vessel penetration requires both the strip and the transducer to be built into the vessel boundary and the transducer cannot therefore be located remotely from the vessel interior as may be necessary when the vessel contains very hot liquids.

The Applicants are also aware of UK Pat. Nos. 2092408, 2137348, 2019568 and 1555549.

According to one aspect of the present invention there is provided a method of monitoring liquid level within a containment vessel, comprising transmitting acoustic wave pulses from transducer means along a waveguide which extends beneath the upper surface of the body of contained liquid and which has at least one pulse-reflecting discontinuity for exposure to the liquid, and analysing the reflected pulse or pulses to detect any loss of acoustic energy as a result of immersion of said discontinuity or discontinuities in the liquid, said method being characterised in that the acoustic wave energy is in the form of Lamb waves injected into the waveguide, said transducer means is located wholly external to the vessel interior, and the waveguide passes through a sealed penetration in a wall of the vessel or is constituted at least in part by a wall of the vessel, said analysing comprising using progressive reduction of the amplitude of the reflected pulse and selecting a mode of the waves having an energy distribution having less energy at the surface of the waveguide than at the center of the waveguide.

The method may be carried out using more than one waveguide, each waveguide having at least one pulse-reflecting discontinuity.

Where the wave guide is provided with more than one discontinuity, they are spaced apart lengthwise of the direction of travel of the pulses along the waveguide and they may also be offset with respect to one another transversely of said direction of travel.

According to a second aspect of the invention there is provided a containment vessel for liquids, incorporating apparatus for use in monitoring liquid level within the vessel, said apparatus comprising transducer means for producing acoustic wave pulses, at least one waveguide means coupled with the transducer and extending downwardly with respect to the vessel interior for contact, in use, with a body of liquid contained within the vessel, the waveguide means having at least one pulse-reflecting discontinuity for exposure to the liquid, and means for analysing the reflected pulse or pulses to detect any loss of acoustic energy as a result of immersion of said discontinuity or discontinuities in the liquid, characterised in that the position of acoustic coupling between the transducer means and the waveguide means is located wholly externally of the vessel interior, and the waveguide means passes through a sealed penetration or penetrations in a boundary of the vessel or is constituted at least in part by a wall or walls of the vessel, the means for analysing comprising means for using progressive reduction of the amplitude of the reflected pulse and selecting a mode of the waves having an energy distribution having less energy at the surface of the waveguide than at the center of the waveguide.

The waveguide means may comprise a single waveguide having a plurality of pulse-reflecting discontinuities or, alternatively, the waveguide means may be constituted by at least two waveguides each having at least one such discontinuity.

The or each waveguide is conveniently of stepped configuration to provide the pulse-reflecting discontinuities.

To allow excitation of Lamb waves, it will be appreciated that the or each waveguide is in the nature of a strip, plate or tube such that the acoustic energy launched into the waveguide from the transducer takes the form of Lamb waves. The Lamb waves may be in fundamental symmetric or anti-symmetric modes or harmonics thereof.

The analysing means may be arranged to trigger a signal, which may be in the form of an alarm signal, in response to waveguide immersion reaching a predetermined level. The analysing means may be operable to relate the degree of reflected signal loss to the extent of waveguide immersion in the liquid.

The waveguide means may, in some circumstances, comprise a structural component or components associated with, or forming part of, the liquid containment vessel, eg in circumstances where the plant already includes, or can be designed to include, a structural component which can function as a waveguide having at least one pulse-reflecting discontinuity.

To promote further understanding of the invention, one embodiment will now be described, by way of example only, with reference to the accompanying drawings in which:

FIG. 2 is a schematic view of the liquid level monitoring apparatus;

FIG. 3 is an idealised graphical representation of the transmitted and received pulses obtained using the apparatus of FIG. 2.

Figure 1:
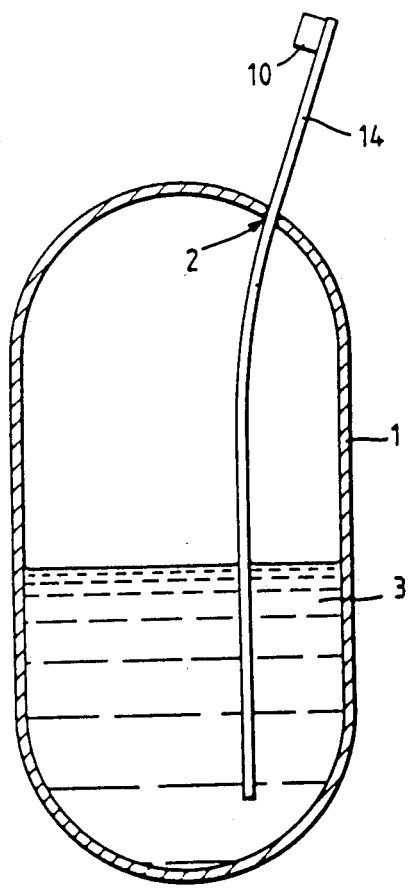
FIG. 1 is a schematic view of a liquid containment vessel incorporating liquid level monitoring apparatus.

Referring to FIG. 1, the vessel 1 shown may be a containment vessel for a hot liquid, eg liquid sodium in a fast neutron fission nuclear reactor. The vessel 1 is provided with apparatus for monitoring the liquid level, the apparatus including a waveguide 14 energised by an ultrasonic transducer 10. The vessel boundary is formed with a penetration 2 through which the waveguide extends into the vessel for partial immersion in the liquid pool 3 contained by the vessel. The nature of the liquid dictates that the transducer 10 should be located remotely from the vessel interior and that the waveguide should be sealed around its periphery to the vessel boundary, eg by a braze or weld extending around its entire periphery. It will be understood that such an arrangement precludes the use of a level indicator as disclosed in U.S. Pat. No. 2787160 for the reasons mentioned in that patent.

The basic concept employed in the present invention is the use of an active element to excite a specific Lamb wave mode in a thin plate waveguide (which may be planar, of arcuate section or tubular) and location of the waveguide in relation to the liquid surface whose level is to be monitored such that, if the liquid rises into contact with the end, or other pulse-reflecting discontinuity of the waveguide exposed to the liquid, mode conversion occurs at the waveguide/liquid interface which results in loss of acoustic energy by transmission of compression waves into the liquid. In contrast with surface waves, as disclosed in U.S. Patent No. 2787160, Lamb waves may traverse a sealed penetration in the vessel boundary and continue along that portion of the waveguide extending downwardly within the vessel interior.

Referring to FIG. 2, the apparatus comprises the transmit/receive ultrasonic transducer 10 connected to pulse-triggering and echo analysing instrumentation 12 and coupled to the thin plate waveguide 14 which may be of considerable length, eg tens of metres, and, although shown in a particular configuration, may be of other configuration to suit the intended application. For instance, the location of the transducer and associated instrumentation remotely from the vessel interior may require the waveguide to be led around obstacles and hence shaped accordingly.

The waveguide 14 is mounted with its terminal portion in the vicinity of the liquid surface 16. As shown in FIG. 2, the waveguide is partly immersed in the liquid but this may not necessarily be the case at all times. The terminal portion of the waveguide is provided with a number of pulse reflecting discontinuities constituted by the end 18 of the waveguide and a series of steps 20A, 20B located at known intervals from the end 18. When a Lamb wave pulse 22 see FIG. 3 - is excited in the waveguide by the transducer 10, it will travel lengthwise along the waveguide, ie in the direction of the arrow (FIG. 2), and undergo reflection at each discontinuity 18, 20A, 20B to produce echoes 24, 26A, 26B which are received by the transducer and can be analysed by the instrumentation to relate each echo with a respective discontinuity.

If the liquid level is such that the end of the waveguide is not immersed, none of the echoes received by the instrumentation 12 will be significantly attenuated compared with the incident pulse 22. If however, the waveguide is partly immersed, loss of acoustic energy will occur as a result of the previously-mentioned mode conversion and the echoes received from those discontinuities which are immersed (see discontinuities 18, 20A in FIG. 2) will be severely attenuated. In this way, by monitoring the amplitudes of the echoes using the instrumentation 12, the level of the liquid can be determined with an accuracy governed by the vertical spacings between the pulse-reflecting discontinuities.

The form of waveguide shown in FIG. 2 is intended to provide high, low and intermediate liquid level detection, intermediate levels corresponding to the length of waveguide between the uppermost step 20A and the lowermost step 20B. As the liquid rises and attenuation of the echo received from each discontinuity occurs, the instrumentation may produce signals to indicate the current level of the liquid and a warning signal or signals may also be produced if the liquid level falls or rises to an unacceptable level. Such warning signals may be used to initiate remedial action to counteract the undesired change in liquid level.

As shown, a single waveguide is used but, if desired, there may be two or more waveguides each having at least one pulse-reflecting discontinuity and energised by a respective externally located transducer; in this event, each waveguide may provide an echo or echoes corresponding to a liquid level or range of liquid levels differing from those of the other waveguide or waveguides.

The pulse-reflecting discontinuities, whether provided by a single waveguide or more than one waveguide, may be spaced vertically at uniform levels and the number of discontinuities may be greatly in excess of the number shown in FIG. 2, especially if level measurement over a considerable range of depths is required.

The liquid level measurements derived will be seen to be of a digital nature, ie discrete levels. However, in practice, when the liquid level contacts the waveguide end or other pulse-reflecting discontinuity, the echo signal attenuation tends to occur progressively as the liquid level continues to rise so that full attenuation does not occur until the liquid level has risen a short distance above the discontinuity. In a more sophisticated embodiment of the invention, the progressive reduction in echo signal amplitude may be employed to provide an indication of the liquid level. For some Lamb wave modes, the attenuation will occur over a few wavelengths (a range of a few millimetres is possible) and this effect may be enhanced by selection of a long wavelength mode having an energy distribution such that there is less energy at the waveguide surface and more at the waveguide centre. In this way, the apparatus may provide an output which is proportionally related to energy loss in the echo signal or signals and hence liquid level.

Figure 4:
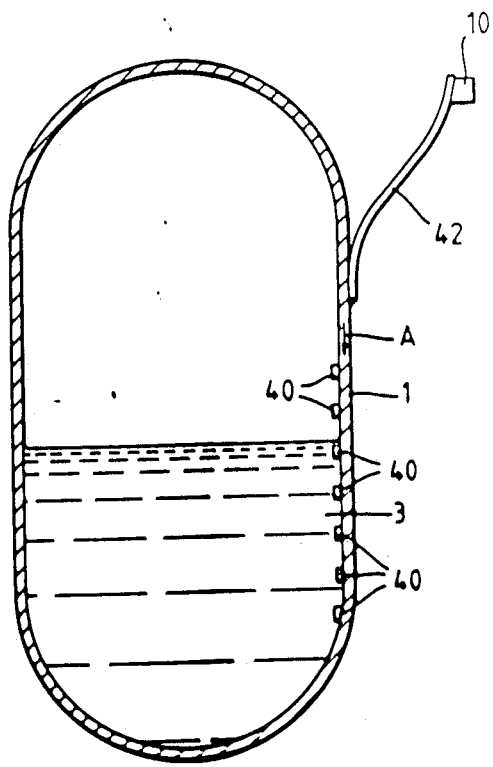
FIG. 4 is a schematic view of an alternative form of the invention in which the vessel wall is employed as a waveguide.

Referring to FIG. 4, this illustrates an alternative embodiment in which the vessel wall itself acts at least in part as the waveguide. The direction of travel of the incident Lamb waves is indicated by arrow A. In this instance, the pulse-reflecting discontinuities are constituted by blocks 40 attached to the internal face of the vessel and exposed to the liquid. The blocks 40 are spaced vertically and are also offset from one another in a direction transverse to the direction of Lamb wave propagation, ie they offset in a generally circumferential direction with respect to the vessel. In FIG. 4, the transducer 10 is shown acoustically coupled to the vessel wall via a waveguide strip 42 brazed to the wall so as to distance the transducer from the hot wall. However, for lower temperature application, the transducer may be directly acoustically coupled with the external surface of the vessel. Instead of blocks 40, the discontinuities may comprise shallow blind holes drilled into the internal surface of the vessel.

I claim:

1. A method of monitoring liquid level within a containment vessel, comprising transmitting acoustic wave pulses from transducer means along a waveguide which extends beneath the upper surface of the body of contained liquid and which has at least one pulse-reflecting discontinuity for exposure to the liquid, and analysing the reflected pulse or pulses to detect any loss of acoustic energy as a result of immersion of said discontinuity or discontinuities in the liquid, said method being characterised in that the acoustic wave energy is in the form of Lamb waves injected into the waveguide, said transducer means is located wholly external to the vessel interior, and the waveguide passes through a sealed penetration in a wall of the vessel said analysing comprising using progressive reduction of the amplitude of the reflected pulse and selecting a mode of said waves having an energy distribution having less energy at the surface of the waveguide than at the center of the waveguide.

2. A method as claimed in claim 1 in which a single waveguide is provided having a series of discontinuities spaced at vertical intervals.

3. A containment vessel for liquids, incorporating apparatus for use in monitoring liquid level within the vessel, said apparatus comprising transducer means for producing acoustic wave pulses, at least one waveguide means coupled with the transducer and extending downwardly with respect to the vessel interior for contact, in use, with a body of liquid contained within the vessel, the waveguide means having at least one pulse-reflecting discontinuity for exposure to the liquid, and means for analysing the reflected pulse or pulses to detect any loss of acoustic energy as a result of immersion of said discontinuity or discontinuities in the liquid, characterised in that the position of acoustic coupling between the transducer means and the waveguide means is located wholly externally of the vessel interior, and the waveguide means passes through a sealed penetration or penetrations in a boundary of the vessel said means for analysing comprising means for using progressive reduction of the amplitude of the reflected pulse and selecting a mode of said waves having an energy distribution having less energy at the surface of the waveguide than at the center of the waveguide.

4. A vessel as claimed in claim 3 in which the waveguide means comrises a single waveguide structure having a plurality of pulse-reflecting discontinuities.

5. A vessel as claimed in claim 3 in which each waveguide is of stepped configuration to provide said pulse-reflecting discontinuities.

6. A vessel as claimed in claim 3 in which the analysing means is operable to relate the degree of reflected signal loss to the extent of waveguide immersion beneath the upper surface of the liquid.

7. A method of monitoring liquid level within a containment vessel, comprising transmitting acoustic wave pulses from transducer means along a waveguide which extends beneath the upper surface of the body of contained liquid and which has at least one pulse-reflecting discontinuity for exposure to the liquid, and analysing the reflected pulse or pulses to detect any loss of acoustic energy as a result of immersion of said discontinuity or discontinuities in the liquid, said method being characterised in that the acoustic wave energy is in the form of Lamb waves injected into the waveguide, said transducer means is located wholly external to the vessel interior, and the waveguide is constituted at least in part by a wall of the vessel, said analysing comprising using progressive reduction of the amplitude of the reflected pulse and selecting a mode of said waves having an energy distribution having less energy at the surface of the waveguide than at the center of the waveguide.

8. A containment vessel for liquids, incorporating apparatus for use in monitoring liquid level within the vessel, said apparatus comprising transducer means for producing acoustic wave pulses, at least one waveguide means coupled with the transducer and extending downwardly with respect to the vessel interior for contact, in use, with a body of liquid contained within the vessel, the waveguide means having at least one pulse-reflecting discontinuity for exposure to the liquid, and means for analysing the reflected pulse or pulses to detect any loss of acoustic energy as a result of immersion of said discontinuity or discontinuities in the liquid, characterised in that the position of acoustic coupling between the transducer means and the waveguide means is located wholly externally of the vessel interior, and the waveguide means is constituted at least in part by a wall or walls of the vessel, said means for analysing comprising means for using progressive reduction of the amplitude of the reflected pulse and selecting a mode of said waves having an energy distribution having less energy at the surface of the waveguide than at the center of the waveguide.

* * * * *